United States Patent [19]
Horton et al.

[11] Patent Number: 5,893,232
[45] Date of Patent: Apr. 13, 1999

[54] NATURAL BAIT HOLDING FISHING LURE

[76] Inventors: Robert Horton, 417 Turner Street, Gatineau Quebec, Canada, J8T-4X8; James Horton, 3779 Route 309, Ange Gardien, Quebec, Canada, J8L-2W9; David K. Matsunaga, 9 Rue D'Evry, Gatineau, Quebec, Canada, J8T-4X8

[21] Appl. No.: 08/933,512

[22] Filed: Sep. 18, 1997

[51] Int. Cl.[6] ................................................ A01K 83/06
[52] U.S. Cl. ................................................... 43/42.35
[58] Field of Search ............................. 43/44.2, 44.4, 43/44.6, 44.8, 42.35

[56] References Cited

U.S. PATENT DOCUMENTS 2,467,971  4/1949  Frair ............................... 43/42.35
2,476,553  7/1949  Huillier ........................... 43/42.35
4,067,135  1/1978  Martin ............................. 43/43.14

*Primary Examiner*—Thomas Price

[57] ABSTRACT

The present invention is a natural bait holding fishing lure, available in multiple sizes, to use with dead bait fish and/or dew worms. This minnow head shaped lure is preferably molded from resin plastic and includes a rod for the trailer model, or tube for the pull-through model, to impale the bait as it is inserted head first into the cavity of the lure. Also connected to the lure is a pivoting L shaped barbed locking pin device, and a metal foil which deflects water to simulate the swimming motion of a live minnow when trolled through the water with the bait attached, and thus promotes attraction of the target fish.

2 Claims, 6 Drawing Sheets

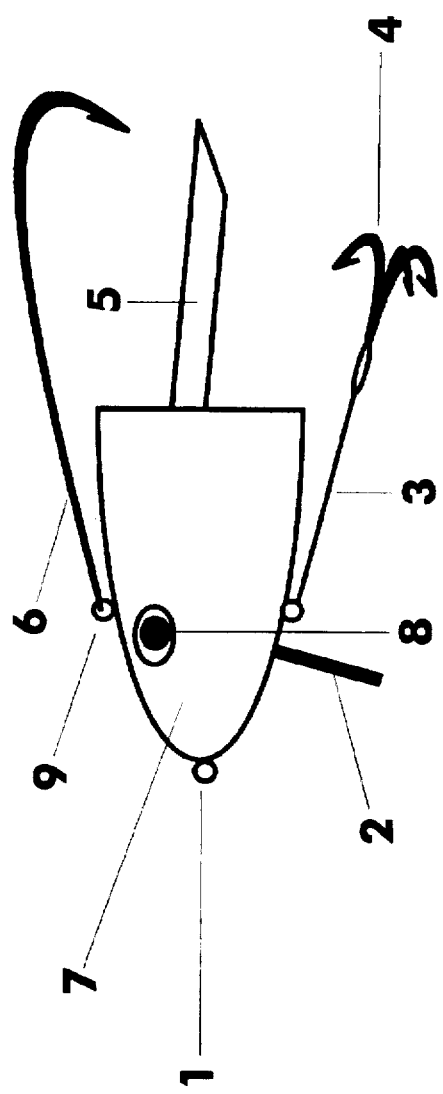
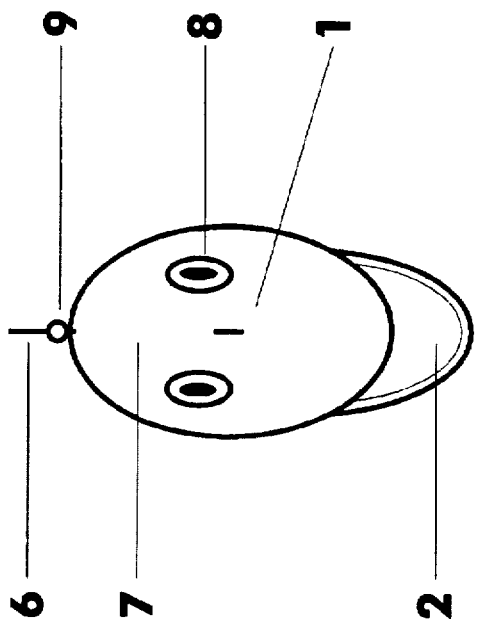
fig. 3
fig. 4

5,893,232

1

NATURAL BAIT HOLDING FISHING LURE

FIELD OF INVENTION

This invention relates to fishing lures designed for use with dead bait fish or dew worms as an integral part of the lure.

A principle object of the present invention is to provide a trolling rig to which a dead bait fish or dew worm is combined to resemble the actions of a live bait fish when trolled through the water, enticing game fish to attack, and the method of its use.

BACKGROUND AND SUMMARY OF THE INVENTION

With the arrival of new laws and rules prohibiting the use of live bait fish in many of our waters, this lure was designed to use dead bait fish or dew worms as an integral part of a fishing lure that would simulate the swimming action of a live bait fish when trolled through the water, enticing game fish to attack.

As most all avid fishermen know, the art of attracting and catching fish is embroidered with enumerable imaginative gadgets and strategies.

There is an endless proliferation of lures and rigs of many forms, employing many techniques. However, it is well-established fact that many varieties of fish are predators and feed on bait fish. Thus, by imitating the actions of the bait fish we can attract the predator.

Since live bait fish fishing has been virtually banned, and methods available to rig dead natural bait fish or dew worms to simulate real live bait fish motion when trolled left us wanting, this design and method of natural bait attachment was invented.

The present invention provides a very carefully designed trolling rig, and a method of combining same with natural bait in two different models hereby called the Trailer Model and the Pull Through Model. Each model can be produced in different sizes to accommodate the range of sizes of available bait fish. The present invention provides a cap made, preferably by molding, to resemble the head of a minnow that has a hollow cavity of a size and shape that will be compatible with the size and shape of the bait minnow specified. This conical cap, which is preferably molded or cast from plastic casting resin, is equipped with a metal foil or bill, counter weighted as required, a stabilizer rod (Trailer Model) or tube (Pull Through Model), and a metal rod with two eyelets on the Trailer Model all anchored within the head.

Also the device to lock the bait to the cap is a barbed L shaped device is attached to an eyelet anchored to the top of the lure. This L shaped device pivots down into the hard back of the bait and held in place by a barbed end.

All these elements combined have resulted in a simple to use, novel trolling rig for natural bait.

On the trailer model, a single wire is used to form an eyelet at the front end of the lure for connection so the forward leader, and an eyelet protruding out of the bottom of the lure, behind the bill, for connection to the hook leader, after being embedded within the molded head. The hook is attached to the free tail of the bait. On the Pull Through model, the solid pointed rod is replaced by a tube which has a bore, opened for the front of the lure to the back of the tube. The diameter of this bore is smaller than the eye of the hook specified for the model size. On this model the hook is attached to a leader, and this leader is threaded through the

2 cavity of the bait and then threaded through the bore of the tube. When the bait is impaled onto the tube the leader is pulled until the eye of the hook is buttressed against the end of the tube and then the leader is attached to the line.

All models have eyes painted with luminous paint, so that the eyes will glow when the ensemble is trolled at depths when there is little light, to attract predator fish.

This combination of the bill to impart the life like minnow motion in the free tail of the bait, the locking device to hold the bait securely from the front half of the bait, leaving the tail free to wobble, the luminous eyes, the stabilizer rod or tube that impale the bait and help hold the bait in the cavity of the lure, and the two hook attaching arrangements have resulted in a simple to use novel rig that will simulate the action and smell of live minnows when trolled through the water. The ensemble is weighted and balanced for each size so that it remains underwater.

SUMMARY OF DRAWINGS

1) FIG. 1. through FIG. 4. gives you the top, back, side and front views of the Trailer Model of the fishing lure respectively.

2) FIG. 5. gives you a cutaway view of the Trailer Model of the fishing lure.

3) FIG. 6.

Figure 8:
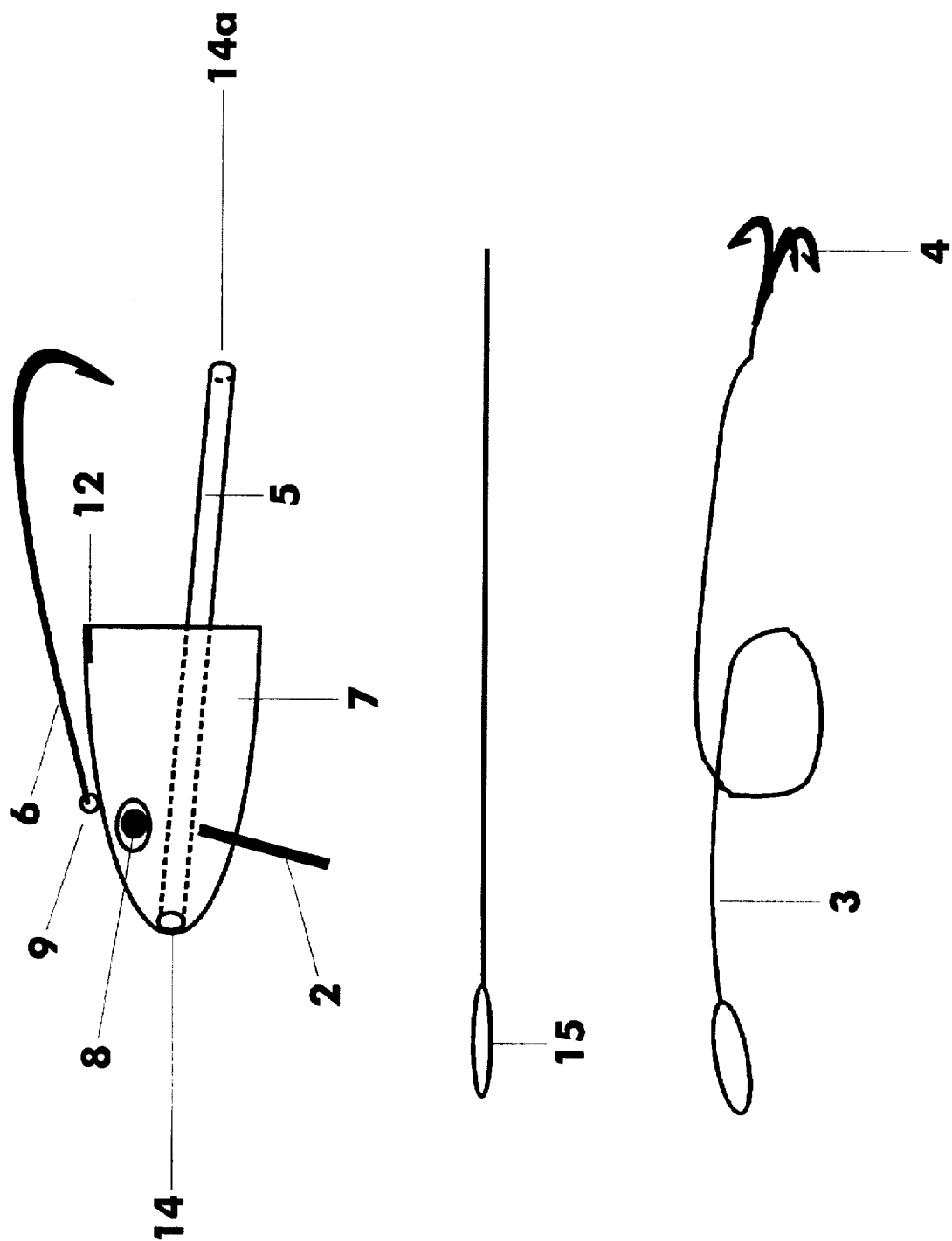
Figure 9:
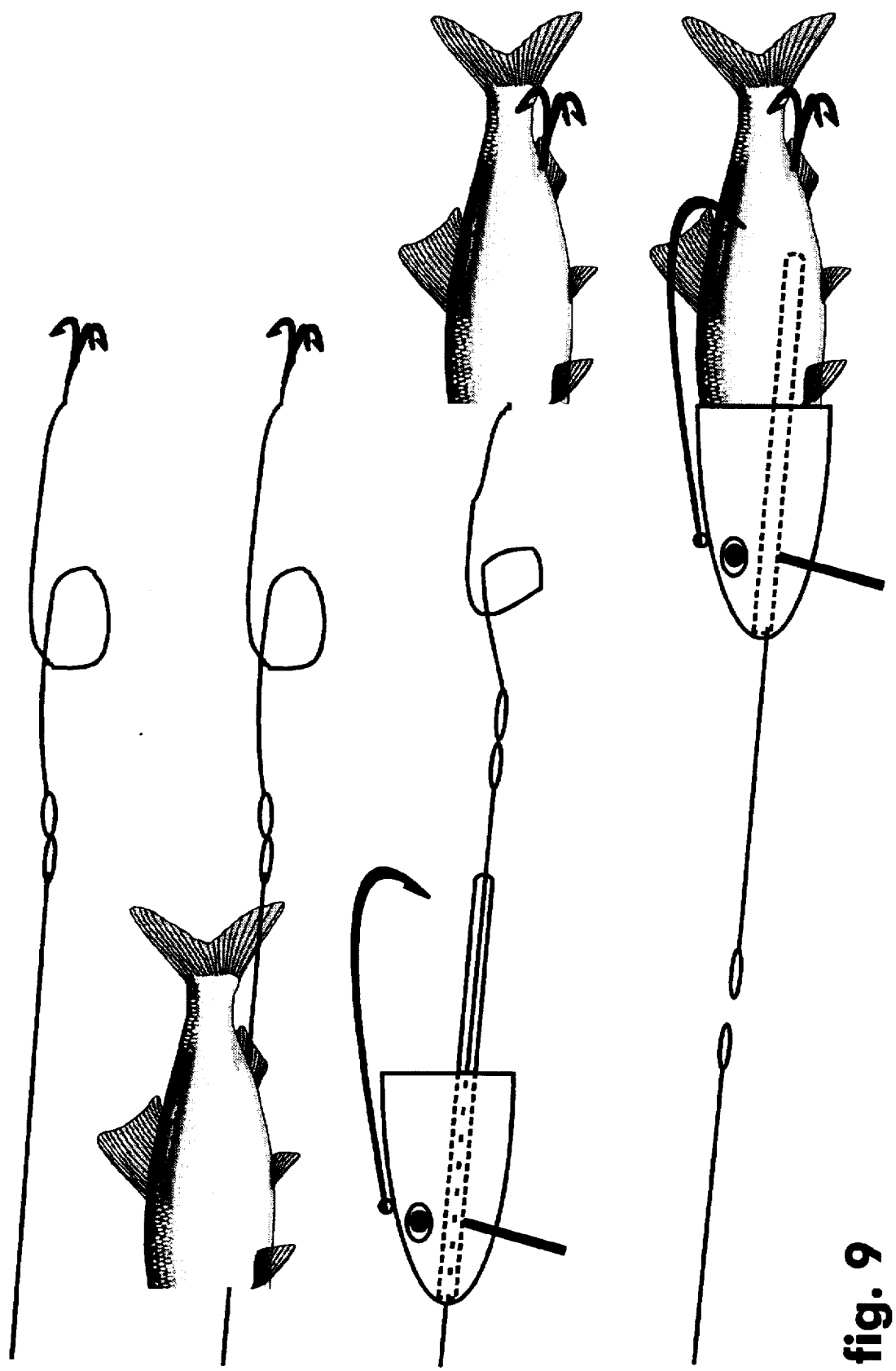

4) FIG. 8. shows us a side view of the Pull Through model of the fishing lure, and 5) FIG. 9. gives you a view of how a minnow is attached to the Pull Through model of the lure.

BRIEF DESCRIPTION OF THE PREFERRED EMBODIMENT

Figure 1:
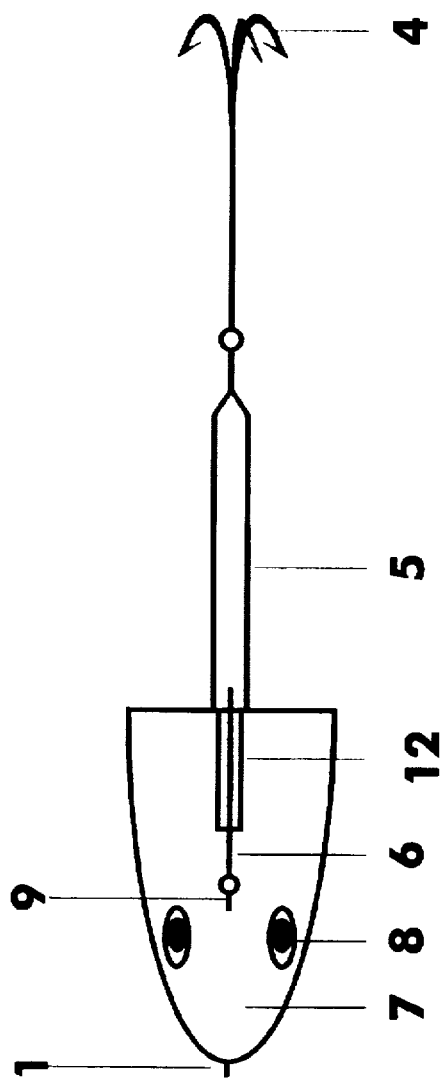
Figure 2:
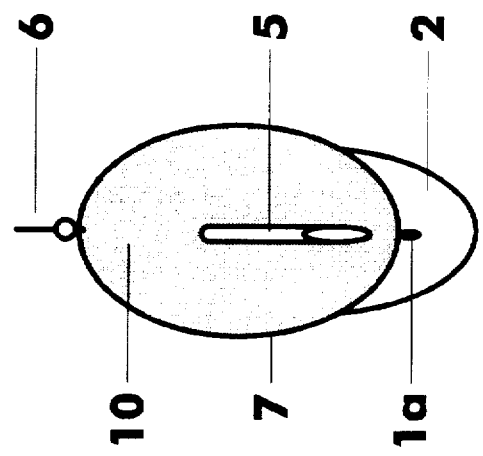

FIG. 1. to FIG. 4. presents the top, back, side and front views of the Trailer Model of the lure, in accordance with the invention, illustrating the complete lure.

Figure 5:
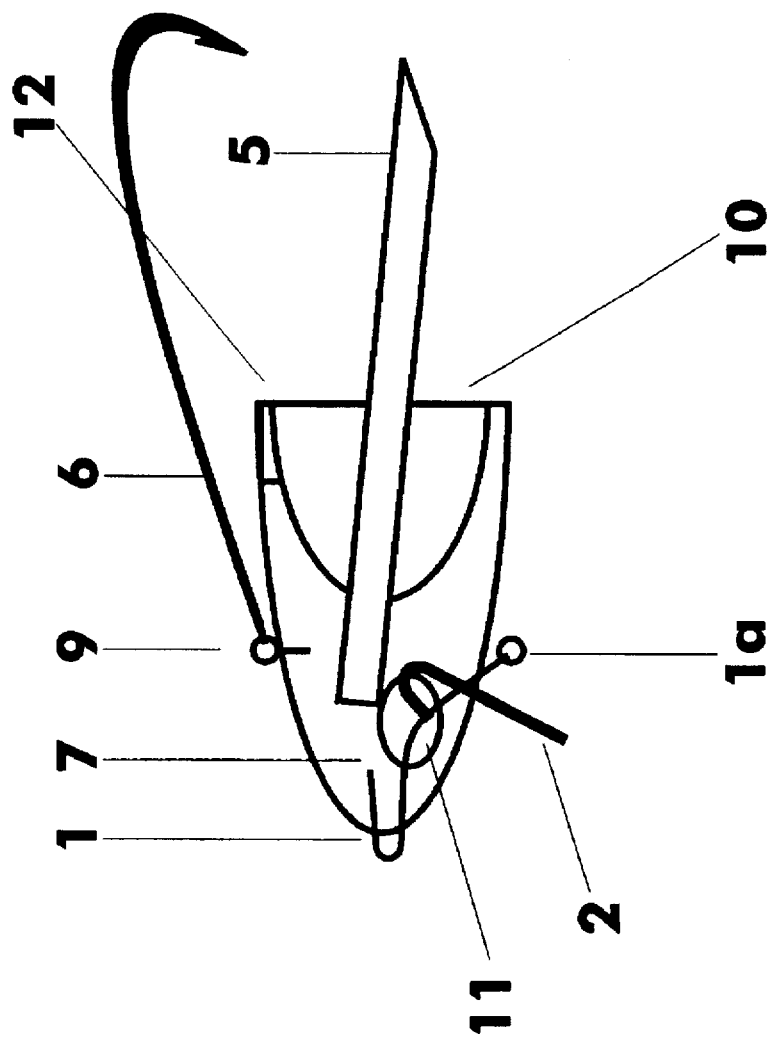

FIG. 5. presents a cutaway view of the Trailer Model of the lure shown in FIG. 1.

Figure 6:
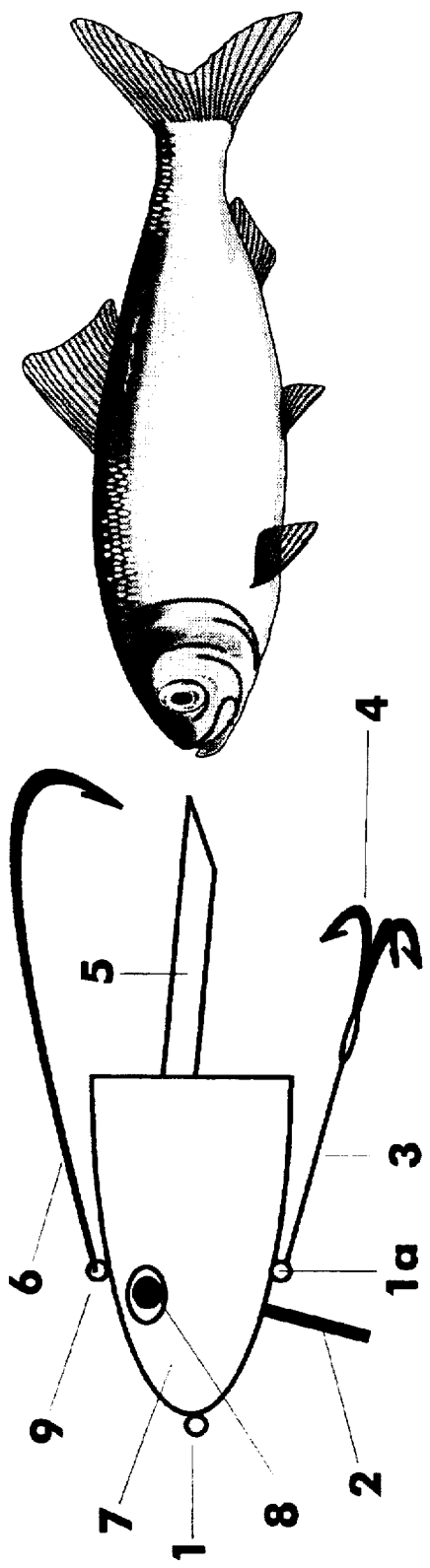
Figure 7:
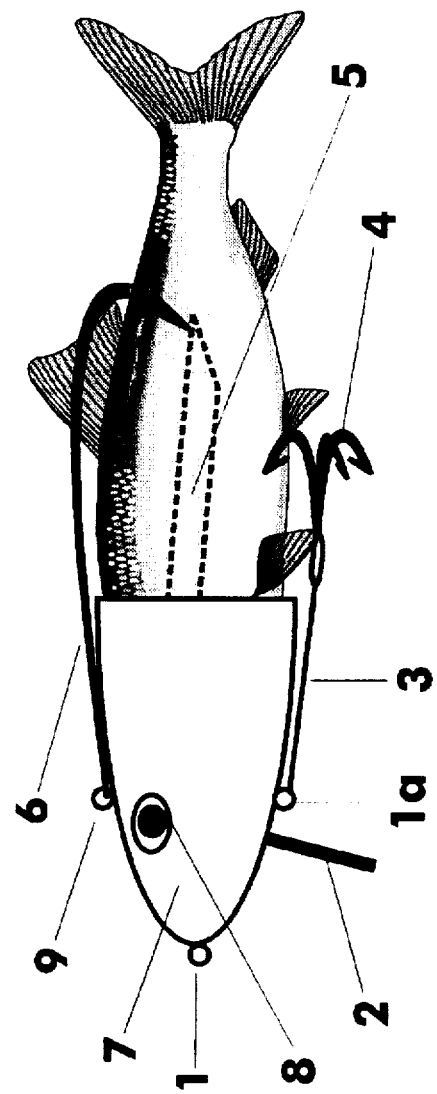
FIG. 7. gives you a view of how a minnow is attached to the Trailer Model of the lure.

FIG. 6. and FIG. 7. is an illustration of how a bait fish is secured to the Trailer Model of the lure.

FIG. 8. presents a side view of the Pull Through Model of the lure, with equipment provided to secure the hook assembly to the fishing rod.

FIG. 9. is an illustration of how a bait fish is secured to the Pull Through Model of the lure.

DESCRIPTION OF THE PREFERRED EMBODIMENT

FIG. 1. to FIG. 4. illustrates the Trailer Model of the lure from four perspectives. Reference character 1 and 1a are the tie line eyelet and hook line eyelets formed from a one piece wire embedded, in the preferably molded resin head referenced 7.

The metal foil reference 2, preferably using a French metal spinning blade of appropriate size, anchored into the molded head reference 7, deflects water to create a lateral wobble in the lure head which results in a natural wiggle in the tail of the natural bait attached, when trolled through the water.

Reference 3 refers to the flexible line attaching the hook (4) to the lure hook eyelet (1a). This material is preferably nylon line or metal leader material of appropriate strength.

Reference 5, the pointed rod, preferably made of unbreakable plastic is designed to impale the cavity of the dead bait fish and is of a diameter and length no longer than half the length of the specific size of bait fish used. It is angled ten degrees below horizontal so that the end is in the stomach cavity just before the anus of the bait fish.

Reference 6 is the L shaped locking device that is attached with an eyelet to an eyelet (9) anchored at the top of the lure head (7). This device is equipped with a barb that is pushed into the hard back of the bait and held onto place with the barb and slot on top of the lure (12).

The eyes (8) are painted with luminous paint so that it will be glowingly visible to predator game fish.

Reference 10 is the cavity into which the head of the bait fish for the specific size lure is inserted after being impaled on the stabilizing rod or tubes (5).

FIG. 5. shows a cut away side view of the internals of the invention. The views shows how the bill (2), the wire with the two eyelets (1, 1a) the pointed rod (5), the area where counterweights are embedded (11) are all molded in place with and insert forming the cavity (10). The eyelet for the pivoting locking device (6) is anchored into place later with glue and the slot for the locking device is later cut into the head.

FIG. 6. and FIG. 7. shows us how the bait fish is loaded into the lure, as it is impaled onto the rod (5), locked into place with the pivoting barbed locking device (6) and how the hook is placed into the torso of the dead bait fish.

These views illustrated in FIGS. 1. through FIG. 7. show the construction ensemble of a loaded Trailer Model of the invention which will lead to a life like minnow action and scent of a live minnow when trolled in the water.

FIG. 8. illustrates the side view of the Pull Through Model of the invention. In place of the pointed rod, we find a hollow tube (14) with a bore from the front of the lure (14) to the rear of the tube (14a). Again, the tube (5), the foil (2) and cavity (10) are molded to from the lure. The locking device eyelet are later glued into place and the locking device (6) added. The slot (12) is cut and the luminous eyes are painted on. The needle (15) and hook (4) and leader (3) assembly are also shown.

FIG. 9. illustrates how the bait fish is loaded onto the lure and locked into place. The eye of the hook buttressed against the end of the tube.

The head (7) is painted on all models in colours resembling the bait fish or custom colour combinations preferred by fishermen.

In summary, this ensemble of the minnow shaped head with its hollow cavity and stabilizing rod or tube for the head of the bait fish, the locking device to hold the bait securely in place, the metal foil to create wobble by defecting water when trolled and the two line and hook attaching devices, luminescent eyes, and paint combine with the bait fish to form a novel trolling rig that will simulate the swimming motion of a live minnow when trolled in the water.

Having described the presently preferred embodiments of the invention, it should be understood that various changes in construction and arrangement will be apparent to those skilled in the art and are fully contemplated herein without departing from the true spirit of the invention. Accordingly, alternatives, modifications and equivalents as may be included within the scope and spirit of the invention are defined in the appended claims.

It is believed that it will be clearly apparent that from the above description and disclosure in the drawings, that the invention comprehends a novel construction of a natural bait holding fishing lure.

We claim:

1. A fishing rig available in multiple sizes for use with dead bait fish or dew worms comprising:

a conical cap configured to appear as the head of a minnow and fabricated from a plastic resin forming a closed end and a hollow cavity molded in the shape of a minnow's head, with a depth to include the head of the dead minnow to the end of the gill cover, a forward eyelet at the front of the lure for connection to a forward leader, a rear eyelet attached to the lower portion of the head behind a metal foil, for connection to a rear leader adapted for connection to a fish hook, the metal foil is embedded in the resin, in the lower front third of the head, fixed at an angle of 110 degrees below horizontal, to impart the desired swimming motion of a live minnow when trolled, a stabilizer rod embedded in the resin and protruding out of the center of the hollow cavity at an angle of approximately 10 degrees below horizontal, with a pointed end to impale the bait and extending into the stomach cavity of the baitfish no further than half the length of the specified length of bait, a L-shaped locking pin supplied with an eye at one end for connection to an eyelet embedded in the top of the lure head, and a barb at the other end that can be pivoted into the back of the bait, holding it firmly in the cavity of the lure, and a means of embedding a counterbalancing lead weight agent to ensure the lure remains upright and slightly weight forward when the specified minnow is attached and the lure is trolled through the water.

2. The rig of claim 1 in which the forward leader eyelet and rear hook leader eyelet are removed and the pointed stabilizer rod is replaced with a hollow tube protruding out the rear of the cavity at a similar length, and angled resulting in an opening from the front of the lure to the back of the tube no larger than the eye of the hook specificized for the lure size, and a hook arrangement tied to a forward leader and can be threaded through the cavity of the bait and through the tube and attached to the line, with the hook eye buttressed against the rear end of the hollow tube.

* * * * *